United States Patent

Ransom et al.

[11] Patent Number: 6,148,324
[45] Date of Patent: Nov. 14, 2000

[54] PRIORITIZED LOAD BALANCING AMONG NON-COMMUNICATING PROCESSES IN A TIME-SHARING SYSTEM

[75] Inventors: Antonio Juan Ransom, Bolingbrook; Dennis James Wiest, Naperville, both of Ill.

[73] Assignee: Lucent Technologies, Inc., Murray Hill, N.J.

[21] Appl. No.: 09/002,982

[22] Filed: Jan. 5, 1998

[51] Int. Cl.[7] .................................................. G06F 9/00
[52] U.S. Cl. .................................. 709/105; 709/103
[58] Field of Search .............................. 709/102, 103, 709/104, 105

[56] References Cited

U.S. PATENT DOCUMENTS

| | | | |
|---|---|---|---|
| 4,481,583 | 11/1984 | Muller | 709/104 |
| 5,309,501 | 5/1994 | Kozik et al. | |
| 5,519,867 | 5/1996 | Moeller et al. | |
| 5,530,860 | 6/1996 | Matsuura | 709/105 |
| 5,550,898 | 8/1996 | Abbasi et al. | |
| 5,615,249 | 3/1997 | Solondz | |
| 5,652,885 | 7/1997 | Reed et al. | |
| 5,655,120 | 8/1997 | Witte et al. | |
| 5,845,116 | 12/1998 | Saito et al. | 709/103 |

OTHER PUBLICATIONS

Armand et al., "Muti–threaded Processes in Chorus/Mix", Chorus Systemes, Apr. 1990—pp. 1–15.
Stevens, "UNIX Network Programming", 1990 Prentice Hall P T R—pp. 72–75.

Primary Examiner—Alvin E. Oberley
Assistant Examiner—Van Nguyen

[57] ABSTRACT

A method and apparatus for prioritized load-balancing among non-communicating processes in a time-sharing system involves a Load Balancing Repository (LBR) which interfaces with each process that is actively addressed by the CPU. A scheduler within each process provides the LBR with a load distribution for that process representing the ratio of high-priority sub-task load to low-priority sub-task load. The LBR determines a target ratio in the form of an aggregate load distribution ratio. The target ratio is reported back to each active process. For processes which are occupied with a relatively low proportion of high priority sub-tasks and which therefore exhibit a load distribution that is below the target ratio, the process scheduler will give up a portion of the time slice allotted to that process by the operating system when the load distribution of that process reaches the target ratio. Thus, CPU resources will be applied more frequently to processes which are occupied with a relatively high proportion of high priority sub-tasks.

17 Claims, 5 Drawing Sheets

CPU LOAD DISTRIBUTION AT INITIAL LBR
REPORTING INTERVAL

|  | CPU LOAD ATTRIBUTABLE TO HIGHEST PRIORITY SUB-TASKS (PRIORITY LEVEL 1) | CPU LOAD ATTRIBUTABLE TO LOWER PRIORITY SUB-TASKS (PRIORITY LEVEL 2) | TOTAL CPU LOAD ATTRIBUTABLE TO PROCESS |
|---|---|---|---|
| PROCESS 1 | $L_{1,1}$ = 20 ms | $L_{1,2}$ = 80 ms | 100 ms |
| PROCESS 2 | $L_{2,1}$ = 40 ms | $L_{2,2}$ = 60 ms | 100 ms |
| PROCESS 3 | $L_{3,1}$ = 60 ms | $L_{3,2}$ = 40 ms | 100 ms |
| AGGREGATE | $AGG_1$ = 120 ms | $AGG_2$ = 180 ms | |

AGGREGATE LOAD DISTRIBUTION RATIO = $AGG_1:AGG_2$ = 120:180 = 2:3

FIG. 4A

CPU LOAD DISTRIBUTION AT SECOND LBR
REPORTING INTERVAL

|  | CPU LOAD ATTRIBUTABLE TO HIGHEST PRIORITY SUB-TASKS (PRIORITY LEVEL 1) | CPU LOAD ATTRIBUTABLE TO LOWER PRIORITY SUB-TASKS (PRIORITY LEVEL 2) | TOTAL CPU LOAD ATTRIBUTABLE TO PROCESS |
|---|---|---|---|
| PROCESS 1 | $L_{1,1}$ = 20 ms | $L_{1,2}$ = 30 ms | 50 ms |
| PROCESS 2 | $L_{2,1}$ = 40 ms | $L_{2,2}$ = 60 ms | 100 ms |
| PROCESS 3 | $L_{3,1}$ = 60 ms | $L_{3,2}$ = 40 ms | 100 ms |
| AGGREGATE | $AGG_1$ = 120 ms | $AGG_2$ = 130 ms | |

AGGREGATE LOAD DISTRIBUTION RATIO = $AGG_1:AGG_2$ = 120:130

FIG. 4B

CPU LOAD DISTRIBUTION AT THIRD LBR
REPORTING INTERVAL

|  | CPU LOAD ATTRIBUTABLE TO HIGHEST PRIORITY SUB-TASKS (PRIORITY LEVEL 1) | CPU LOAD ATTRIBUTABLE TO LOWER PRIORITY SUB-TASKS (PRIORITY LEVEL 2) | TOTAL CPU LOAD ATTRIBUTABLE TO PROCESS |
|---|---|---|---|
| PROCESS 1 | $L_{1,1}$ = 20 ms | $L_{1,2}$ = 22 ms | 42 ms |
| PROCESS 2 | $L_{2,1}$ = 40 ms | $L_{2,2}$ = 43 ms | 83 ms |
| PROCESS 3 | $L_{3,1}$ = 60 ms | $L_{3,2}$ = 40 ms | 100 ms |
| AGGREGATE | $AGG_1$ = 120 ms | $AGG_2$ = 105 ms |  |

AGGREGATE LOAD DISTRIBUTION RATIO = $AGG_1:AGG_2$ = 120:105

FIG. 4C

CPU LOAD DISTRIBUTION AT FOURTH LBR
REPORTING INTERVAL

|  | CPU LOAD ATTRIBUTABLE TO HIGHEST PRIORITY SUB-TASKS (PRIORITY LEVEL 1) | CPU LOAD ATTRIBUTABLE TO LOWER PRIORITY SUB-TASKS (PRIORITY LEVEL 2) | TOTAL CPU LOAD ATTRIBUTABLE TO PROCESS |
|---|---|---|---|
| PROCESS 1 | $L_{1,1}$ = 20 ms | $L_{1,2}$ = 18 ms | 38 ms |
| PROCESS 2 | $L_{2,1}$ = 40 ms | $L_{2,2}$ = 35 ms | 75 ms |
| PROCESS 3 | $L_{3,1}$ = 60 ms | $L_{3,2}$ = 40 ms | 100 ms |
| AGGREGATE | $AGG_1$ = 120 ms | $AGG_2$ = 93 ms |  |

AGGREGATE LOAD DISTRIBUTION RATIO = $AGG_1:AGG_2$ = 120:93

FIG. 4D

PRIORITIZED LOAD BALANCING AMONG NON-COMMUNICATING PROCESSES IN A TIME-SHARING SYSTEM

BACKGROUND OF THE INVENTION

This invention relates generally to methods and apparatus for controlling digital processing systems involving at least one central processing unit (CPU) and a plurality of application processes to be performed. Specifically, the invention relates to systems and techniques for balancing or distributing CPU load among non-communicating processes in a time-sharing system.

In time-sharing or multitasking environments, many application processes or tasks may, at a given time, compete for processing resources provided by one or more central processing units. While the CPU does not typically execute processes simultaneously, the processes are active in the sense that they share CPU resources, i.e., processing time, until they are completed.

The real-time occupancy of CPU resources by an active application processes is referred to as the CPU "load" attributable to that process. In a time-sharing system, the load attributable to each active application process is often controlled or balanced by the operating system according to a predetermined protocol. The term "load balancing" refers to systems and techniques for allocating CPU resources among active application processes. Load balancing may accomplish different desired objectives. For example, the CPU load attributable to each application process may be governed according to preassigned priority levels. Other load-balancing techniques seek quick execution times for the application processes.

In complex time-sharing or multitasking systems, hundreds of application processes, or tasks, may be in active competition for CPU resources at a given time. Each of these application processes may include hundreds or thousands of sub-tasks. In wireless cellular communication systems, for example, telephone network access is provided through radio communication between mobile subscriber radiotelephones and cell sites located within contiguous geographic areas. Each cell site is equipped with various hardware and software, including radio transceivers, antennas and control equipment to facilitate signal transmission between mobile subscribers and the cell sites. In advanced cellular systems, control of a significant portion of cellular networks may be provided through a single CPU, the resources of which are shared among multiple radio control systems (RCS's) each supporting multiple microcells and each relying on its own resident software support applications. An operating system, for example a UNIX-based operating system, is provided with a scheduler, which is responsible for sharing CPU resources among the RCS's. Within each RCS, software applications processes are provided to control various sub-tasks, such as call processing, translation, and auditing associated with that RCS. These sub-tasks have varying levels of importance or priority. Operating systems like UNIX provide for externally assigned priories for the application processes running under them. Typically, all software application processes of equal priority are allotted equal portions of CPU time by UNIX.

The aforementioned prioritizing techniques for load-balancing may provide inadequate results when applied to time-sharing systems like those employed to control complex wireless communication networks. In such systems, the particular type of functions being addressed at the sub-task level should be considered for proper load-balancing. With known techniques, however, this is not feasible. Typically, memory or processing limitations prevent the operating system from tracking detailed information at the sub-task level. Rather, CPU resources are allotted only with regard to the priorities assigned at the application process level. Known systems therefore provide no capability for monitoring determining which application processes are, at any given time, devoting most of their CPU resource allotment to high priority sub-tasks. Nor do they provide the capability to monitor or determine which application processes are devoting most of their CPU time slice to accomplish low priority sub-tasks. Thus, the completion of high priority tasks in one active application process may be delayed while CPU resources are committed to lower priority tasks in another application process.

The problem becomes more apparent when explained in the context of the wireless communication system example discussed above. Sub-tasks associated with call processing or translation are obviously more important than sub-tasks associated with auditing, maintenance or "housekeeping" functions: a "bottleneck" in call processing might result in delays to subscribers placing calls. Maintenance sub-tasks, on the other hand, are usually designed to fill "idle time" within the CPU time slice allotted to a given process. Call processing and translation are "message driven" processes, that is, they are initiated by external events like subscribers placing calls and the CPU resources they require vary from time to time. From the operating system's perspective, all application processes at a given UNIX priority level are competing for equal slices of CPU time. The operating system provides no way of determining when one RCS is utilizing all of its CPU resource allotment to address call processing, a high-priority function, while another RCS may be utilizing all of its CPU resources only to accomplish less-important auditing or maintenance functions. Thus, CPU resources are not allocated in a manner that favors completion of high-priority functions over low-priority functions at the sub-task level.

It would therefore be desirable to provide a method and apparatus for load-balancing which allocates CPU resources in a manner that favors completion of high-priority functions over low-priority functions at the sub-task level. Such a system would be capable of distributing the CPU load in such a manner that active application processes which are utilizing their CPU resource allotment to complete a relatively small proportion of high-priority sub-tasks will relinquish resources in favor of one or more other active processes that are utilizing their CPU resource allotment to complete a relatively high proportion of high-priority sub-tasks.

SUMMARY OF THE INVENTION

The present invention provides a method and an apparatus for load balancing among non-communicating processes in a time-sharing system which method and apparatus achieve the aforementioned objectives. In accordance with the invention, CPU resources are allocated in a manner that favors completion of high-priority sub-tasks over completion of low-priority sub-tasks within all active processes. Sub-tasks in each application process are assigned one of at least two priority levels. Each process is provided with a reporting sub-task which interfaces with a Load Balance Repository (LBR). The LBR may be another process provided under the operating system. The interface may be a message interface or may be accomplished through shared memory access among the processes. The reporting sub-task of each active application process reports the load distribution for that process to the LBR. The load distribution is quantified in a ratio of the CPU load, i.e., processing time, attributable to highest priority sub-tasks to the CPU load attributable to each lower level of priority sub-tasks, for that process to the LBR.

The LBR determines a target load distribution ratio by aggregating the load distribution ratios of all active processes and reports the aggregate load distribution back to each active application process as a target ratio. A scheduler within each process monitors the current load distribution ratio of that process. Processes that have a load distribution ratio which is lower than the target ratio are utilizing CPU resources for a relatively small proportion of high-priority sub-tasks compared to the average proportion among all active processes. The corresponding scheduler within such processes relinquishes CPU resources when the current load distribution equals or exceeds the target ratio, thus sacrificing a portion of the CPU time slice allotted to that process under the operating system.

The invention provides the advantage that the CPU load distribution will evolve to a state in which active application processes that expend CPU resources toward the completion of a relatively high proportion of lower priority sub-tasks receive a shorter duration of CPU time, while CPU resources are applied more frequently to one or more other active processes which are expending CPU resources towards the completion of a relatively high portion of higher priority sub-tasks.

BRIEF DESCRIPTION OF THE DRAWINGS

The invention may take physical form in certain parts and steps, a preferred embodiment of which will be described in detail in this specification and illustrated in the accompanying drawings which form a part hereof, wherein:

FIG. 4A is a table representing the process load distributions at an initial LBR reporting interval according to the present invention;

FIG. 4B is a table representing the CPU load distribution at a second LBR reporting interval according to the present invention;

FIG. 4C is a table representing the CPU load distribution at a third LBR reporting interval according to the present invention; and FIG. 4D is a table representing the CPU load distribution at a fourth LBR reporting interval according to the present invention.

DETAILED DESCRIPTION OF THE PREFERRED EMBODIMENT

Figure 1:
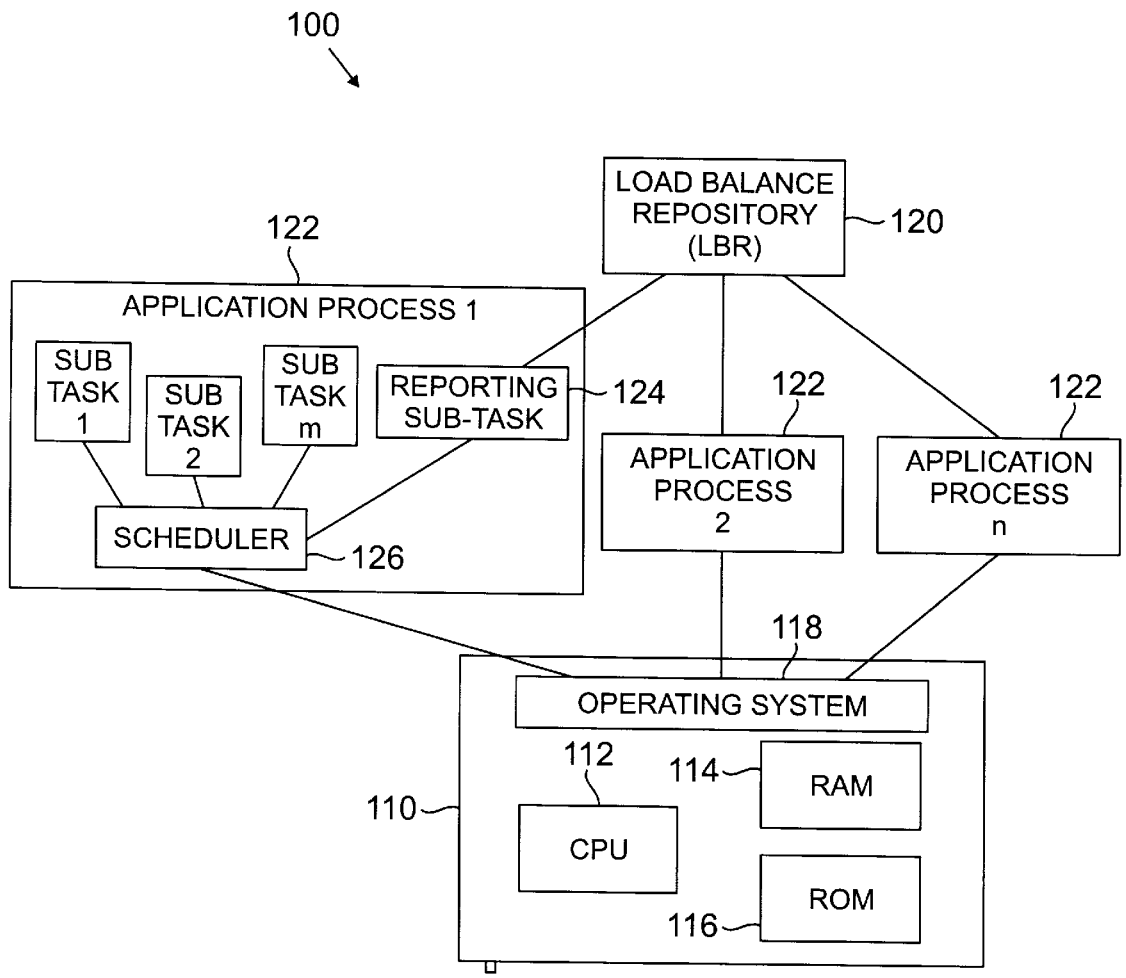
FIG. 1 is a schematic showing the organization of a computer platform and a prioritized load balancing system according to a preferred embodiment of the present invention.

FIG. 1 is a schematic representation of a load-balancing system 100 according to the present invention. Computer platform 110 includes hardware components such as CPU 112 for executing instructions stored in RAM 114 and ROM 116. CPU 112 represents either single CPU or multiple CPU's operating in parallel. Those of ordinary skill will recognize that FIG. 1 is a rather abbreviated depiction of computer platform 110, which would also typically include various peripheral devices and data buses. Only those elements of platform 110 necessary for a detailed description of the present invention are included. Computer platform 110 also includes operating system 118 which provides a procedural interface between CPU 112 and a number (n) of application processes 122. Operating system 118 may be a full-function operating system such as UNIX.

As exemplified by the schematic representation of application process 1, each application process 122 includes a number (m) of sub-tasks which are executed according to the administrative control of a corresponding scheduler 126. While only three application processes are represented in FIG. 1, it will be recognized that systems typical of those to which the invention is applicable may involve hundreds of active application processes. In turn, each process may include hundreds or thousands of sub-tasks.

The sub-tasks within each process 122 will have varying priority levels depending on their associated function. The scheduler 126 within each process 122 will always schedule higher priority sub-tasks to run before lower priority sub-tasks. In its simplest form, the scheduler 126 will recognize only two priority levels—high or low. In a more complex form, one of several different priority levels may be assigned to each sub-task. The present invention finds application to both priority schemes.

In accordance with the present invention, LBR 120 interfaces with a reporting sub-task 124 in each of processes (1–n). This interface may be in the form of a message interface implemented via operating system 118. Alternatively, the interface may be implemented via shared memory access whereby each application process 122 is provided with routines (not illustrated) for writing to and reading predetermined memory locations that are also accessed by LBR 120. In the case of a message interface, the LBR will function to update the average for the reporting processes and the aggregate load for the CPU at the time that the message is received. The LBR could also function to update only at timed intervals for all processes. This would require the LBR reporting interval, described below, to be more frequent than the reporting interval of any application process 122.

Figure 2:
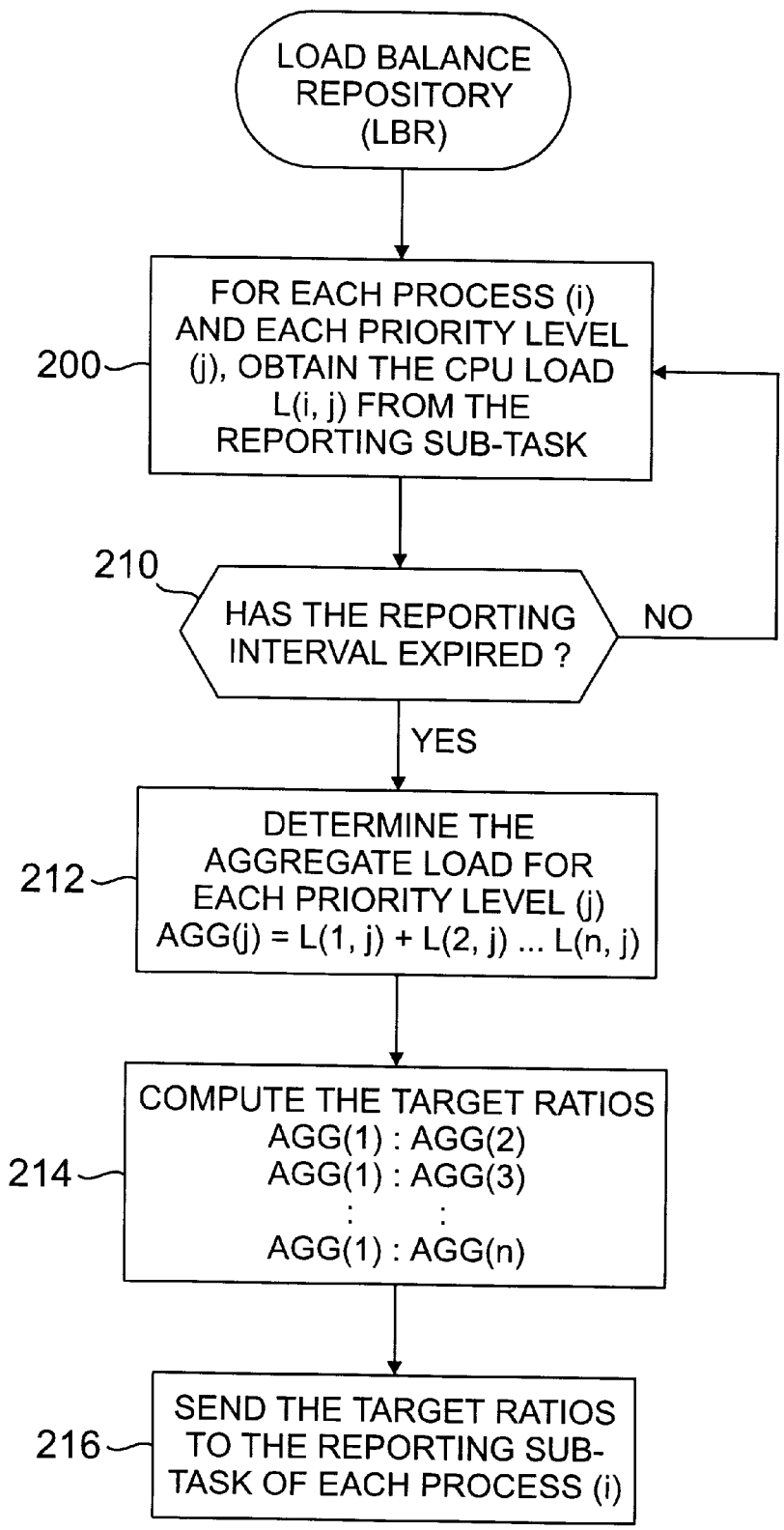
FIG. 2 is a flow chart illustrating the Load Balance Repository (LBR) process according to a preferred embodiment of the present invention.

FIG. 2 is a flow chart depicting a process for implementing the LBR 120 according to the present invention. The flow chart describes the general logic flow for a system which has (n) processes and (j) priority levels of sub-tasks. At step 200, LBR 120 obtains the CPU load distribution from each active application process 122. For each of the (n) active processes, the load distribution is reported to LBR 120 by the application process scheduler 126 via reporting sub-task 124. The load attributable to sub-tasks of process (i) at a given priority level (j), may be represented by $L(i,j)$. For example, L (1,1) represents the load attributable to priority level 1 (the highest priority level) sub-tasks in process 1; L1,2 represents the load attributable to priority level 2 sub-tasks in process 1; and L(2,1) represents the load attributable to priority level 1 sub-tasks in process 2. CPU load L may be represented by a value corresponding to the time, i.e. milliseconds, that the CPU is executing sub-tasks at a given priority level.

Typically, operating system 118 will recognize different several different priority levels assigned to application processes (1–n). Application processes running at identical priority levels are allotted equal amounts of CPU time under operating system 118. The number of priority levels utilized by operating system 118 may differ from the number of priority levels by the present invention. For example, UNIX-based operating systems may recognize eight (8) priority levels: 0 through 7. Sub-tasks running under UNIX may be assigned one of eight priority levels. However, the load distribution scheme of the present invention may recognize less than all of the UNIX priority levels. In such a case, each application would need to map the UNIX priority levels to the priority levels utilized by the LBR. For instance, if the LBR implements a load distribution reporting scheme that involves only two priority levels—high and low—UNIX priority levels 0–3 would map to low priority while UNIX priority levels 4–7 would map to high priority. This scheme permits application processes with different UNIX priority levels to compare loads on equivalent terms within the LBR implementation.

Step 210 is a decision step where the LBR process evaluates whether the reporting interval has expired. According to a preferred embodiment of the invention, the LBR periodically obtains the load distribution ratios from each active process (I) according to a reporting interval, preferably on the order of one second. If the reporting interval has not expired, the LBR process returns to step 200 to obtain the loads L(i,j). Those of ordinary skill will recognize that the loads L(i,j) may change during the reporting interval as various sub-tasks within the processes are completed or become active or inactive. In the event that the reporting interval has expired, the LBR process continues to step 212, where aggregate load values are determined for each sub-task priority level. At step 212, LBR 120 aggregates the load L(i,j) for each priority level (j). The aggregate load attributable to a given sub-task priority level (j) may be expressed as:

$$AGG(j) = L(1,j) + L(2,j) + \ldots L(n,j) \quad (1)$$

where n is the number of processes.

At step 214, the LBR process determines the aggregate load distribution or target ratios. These represent the ratio of the aggregate highest priority sub-task load to each of the aggregate lower priority loads. At step 216, the aggregate load ratios are reported to the reporting sub-task of each process for use by the corresponding scheduler in a manner explained below.

FIG. 2 represents the generalized logic flow of the LBR process. An example of the generalized logic flow applied to a simplified system involving only three processes and only two sub-task priority levels is instructive with regard to the LBR process. Such an example will be explained with reference to FIGS. 4A, which represents the CPU load distribution during the initial LBR reporting interval for such a simplified system. Step 200 would involve the determination six CPU loads L(i,j)—two for each of processes 1, 2 and 3. Thus, at the initial reporting interval, the 100 milliseconds (ms) load, which is the time interval allotted by the operating system, attributable to process 1 is comprised of 20 ms attributable to high priority (priority level 1) sub-tasks, while 80 ms is attributable to lower priority sub-tasks (priority level 2). The loads for processes 2 and 3 are similarly represented in FIG. 4A. The total CPU load is 100 ms for each process because the operating system allots a time slice of 100 ms to each process. While each process can relinquish control to the operating system before the time slice expires, processes cannot increase the time slice beyond the interval allotted by the operating system. Since this example concerns the first LBR reporting interval, step 210 would, by definition, branch to step 212 where two aggregate loads AGG(1) and AGG(2)—one for each sub-task priority level—are determined. In this example, the value for AGG(1) would be 150 ms and the value for AGG(2) would be 150 ms. At step 214, one aggregate ratio would be determined: AGG(1):AGG(2) which is equal to 120:180. The aggregate load ratio in this case thus represents that on average with regard to all active processes (in this case three), more CPU load is attributable to low priority sub-tasks than is attributable to high priority sub-tasks.

Figure 3:
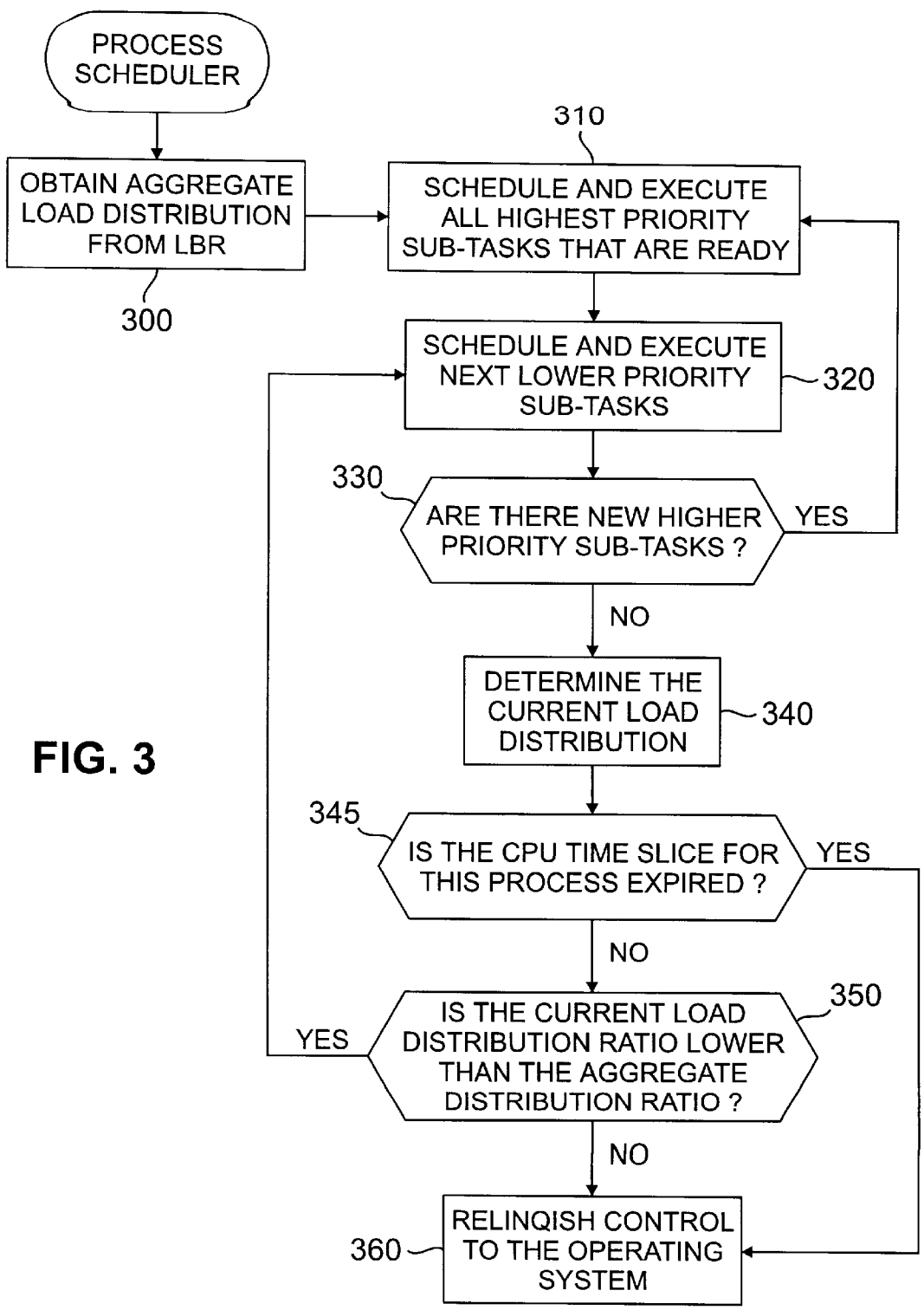
FIG. 3 is a flow chart illustrating a process scheduler according to a preferred embodiment of the present invention.

FIG. 3 is a flow chart representing the logic flow in a process scheduler 126. At step 300 scheduler 126 obtains the aggregate load distribution or target ratio(s) from the LBR. Next, at step 310, all highest priority (i.e., priority level 1) sub-tasks that are ready are scheduled and executed by the CPU. The scheduling process then proceeds to step 320 where the next lower priority sub-tasks are scheduled and executed. At step 330, the process determines whether new higher priority sub-tasks have become active. If so, these sub-tasks are scheduled and executed as the process branches back to step 310. If no new higher priority sub-tasks have become active, the process determines the current load distribution at 340. Step 345 involves a determination as to whether the CPU time slice allocated to the process has expired. If so, the routine branches to step 360 where process control is relinquished to the operating system. If the CPU time slice has not expired, the process continues to step 350. At step 350, the scheduler determines whether the current load distribution ratio is lower than the aggregate load distribution ratio, the process branches back to step 320 where the allotted CPU resources are applied to lower priority sub-tasks. If the current load distribution ratio is not less than the aggregate load distribution ratio, the process proceeds to step 360 where the load attributable to the process is adjusted by reducing the time allotment provided to that process.

Those of ordinary skill in the art will recognize that the logic flow depicted in FIG. 3 is applicable to systems having two or more sub-task priority levels. In the case of three sub-task priority levels, for example, the scheduling process would first adjust CPU load based on current load distribution represented by the highest and second-highest priority levels. If all sub-tasks of highest and second-highest priority levels are completed, the process would then determine the distribution ratio at step 350 by evaluating the CPU load attributable to the third-highest priority level and adjusting the load when the load distribution respecting the highest and third-highest priority levels reach the aggregate values.

Returning to the simplified example discussed above with respect to FIG. 4A, The load distribution during the second LBR reporting interval is shown in the table in FIG. 4B. The CPU load distribution will be adjusted during the second LBR reporting interval as a result of the schedulers 126 of processes 1 and 2. This distribution represents a simplified situation in which no new high priority sub-tasks become active during the second reporting interval. Typically, however, new high priority sub-tasks will become active and the load distribution within the process will be altered. Importantly, the scheduler 126 in process 1 voluntarily relinquishes CPU resources after 50 ms because process 1 will meet the target distribution ratio, 120:180 after 20 milliseconds of high priority work and 30 seconds of low priority work are performed. The load distribution of process 2 remains unaltered because its original distribution is equal to the target distribution ratio. Process 3 will perform 60 ms of high priority work and 40 ms of low priority work, as in the initial LBR reporting interval. Although process 3 would need to perform 90 ms of low -priority work to meet the target distribution ratio, only 100 ms of time is allotted by the operating system.

It will be recognized that during the second LBR reporting interval, the CPU load attributable to process 1 has been reduced from 100 ms to 50 ms. Therefore, CPU resources will be applied to processes 2 and 3 50 ms earlier than would be the case without LBR implementation. Thus, high-priority sub-tasks within process 3 will be addressed earlier because of the LBR implementation. This results a more frequent application of CPU resources to processes that are busy with a relatively large proportion of high priority sub-tasks.

Further iterations of the third and fourth LBR reporting intervals in the three-process, two-priority level example are shown in FIG. 4C and FIG. 4D, respectively. Referring to FIG. 4C, the CPU resources applied to process 1 is further reduced to 41.6 ms. Similarly, the CPU resources applied to process 2 are reduced from 100 ms (FIG. 4B) to 83.2 ms. Process 3, which has the highest load distribution ration (60:40) will receive processing time after (42+83=) 125 ms, or about 25 ms earlier than in the previous iteration represented by FIG. 4B. Referring to FIG. 4D, CPU resources are applied to process 3 after (38+75=) 113 ms. It will be recognized that further iterations of the LBR will result in further reduction in the aggregate load distribution ratio and each application process will drift toward equal load distributions.

The present invention thus provides for a shift of CPU resources away from processes that are occupied with a relatively low proportion of high priority sub-tasks towards application processes that are occupied with relatively high proportion of high-priority sub-tasks. It is to be understood that the preceding description relates to only one preferred embodiment of the invention. Numerous other arrangements and modifications will occur to those of ordinary skill upon a reading of this specification. The scope of the invention is intended to cover all such arrangements and modifications and will be defined in the accompanying claims.

What is claimed is:

1. In a digital processing system having a central processing unit (CPU) and an operating system for executing a plurality of active application processes, the operating system allotting CPU resources to each process, each process including a plurality of sub-tasks, each sub-task being assigned one of a plurality of priority levels, the priority levels including a highest priority level and at least one lower priority level, a method of balancing the CPU load comprising the steps of:

a) determining a load distribution ratio for each process, the load distribution ratio representing the ratio of CPU resources allotted to highest priority sub-tasks to CPU resources allotted to each level of lower priority sub-tasks within the process;

b) determining an aggregate load distribution ratio representing the ratio of total CPU resources allotted to highest priority sub-tasks to total CPU resources allotted to each level of lower priority sub-tasks among the processes; and c) adjusting the CPU resources applied to a selected process when the load distribution ratio of the selected process differs from the aggregate load distribution ratio.

2. The method according to claim 1, wherein the step of adjusting comprises the step of limiting CPU resources applied to the selected process.

3. The method according to claim 1, wherein the sub-tasks are assigned one of two priority levels.

4. The method according to claim 1, wherein the step of adjusting further comprises the steps of:

i) reporting the aggregate load distribution ratio to the selected process;

ii) determining a current load distribution ratio of the selected process; and iii) relinquishing a portion of the CPU resources allotted to the selected process by the operating system when the current load distribution ratio of the selected process equals or exceeds the aggregate load distribution ratio.

5. The method according to claim 1, wherein the step of determining a load distribution ratio comprises the steps of:

i) determining the amount of CPU time occupied by highest priority sub-tasks; and ii) determining the amount of CPU time occupied by each level of lower priority sub-tasks.

6. In a digital processing system having at least one central processing unit (CPU) for executing a plurality of processes, each process including a plurality of sub-tasks, a method of balancing load on the at least one CPU comprising the steps of:

a) assigning either a high or low priority level to each of the sub-tasks;

b) determining a load distribution ratio for each process, the load distribution ratio being defined as the ratio of the load attributable to high priority tasks to the load attributable to low priority tasks;

c) determining an aggregate load distribution ratio by aggregating the load distributions ratios for each process;

d) adjusting the load attributable to at least one selected process when the load distribution ratio of the selected process differs from the aggregate load distribution ratio.

7. The method according to claim 6, wherein the step of adjusting comprises the step of limiting CPU resources applied to the selected process.

8. The method according to claim 6, wherein the step of adjusting further comprises the steps of:

reporting the aggregate load distribution ratio to the selected process;

determining a current load distribution ratio of the selected process; and relinquishing a portion of the CPU resources allotted to the selected process by an operating system when the current load distribution ratio of the selected process equals or exceeds the aggregate load distribution ratio.

9. The method according to claim 6, wherein the step of determining a load distribution ratio comprises the steps of:

determining the amount of CPU time occupied by highest priority sub-tasks; and determining the amount of CPU time occupied by each level of lower priority sub-tasks.

10. In a time-sharing digital processing system having a central processing unit for executing a plurality of non-communicating processes stored in memory, each process including a plurality of sub-tasks, a method of load balancing comprising the steps of:

a) assigning one of a plurality of priority levels to each sub-task, the priority levels including a highest priority level and at least one lower priority level;

b) periodically determining a target load distribution ratio based on the ratio of the aggregate CPU resources attributable to highest priority sub-tasks to the aggregate CPU load among the processes attributable to each level of lower priority sub-tasks;

c) limiting the load attributable at least one selected process when the load distribution ratio of the at least one selected process equals the target load distribution.

11. The method according to claim 10, wherein the step of limiting comprises, the step of relinquishing a portion of a time slice of the central processing unit to an operating system.

12. The method according to claim 10, wherein the step of assigning further comprises the step of assigning one of two priority levels.

13. The method according to claim 10, wherein the step of limiting further comprises the steps of:

i) reporting the target load distribution ratio to the selected process;

ii) determining a current load distribution ratio of the selected process; and iii) relinquishing a portion of the CPU time allotted to the selected process by an operating system when the current load distribution ratio of the selected process equals or exceeds the target load distribution ratio.

14. The method according to claim 10, wherein the step of determining a load distribution ratio comprises the steps of:

i) determining the amount of CPU time occupied by highest priority sub-tasks; and ii) determining the amount of CPU time occupied by each level of lower priority sub-tasks.

15. In a digital processing system, including a central processing unit for executing a plurality of application processes, memory for storing instructions corresponding to the application processes, each of the processes including a plurality of sub-tasks, each having either a high or low priority level assigned thereto, a system for distributing load on the central processing unit comprising:

a) a scheduler associated with each of the processes for scheduling execution of sub-tasks within a corresponding process, each scheduler determining load distribution among high and low priority sub-tasks within that process;

b) a load balance repository for receiving the load distribution from each process and for determining a target load distribution, wherein the load balance repository determines the target load distribution based on a ratio of an aggregate central processing unit load that is attributable to high priority sub-tasks to an aggregate central processing unit load that is attributable to low priority sub-tasks; and c) each scheduler limiting a load attributable to a corresponding process when the load distribution of the corresponding process differs from the target load distribution.

16. The system according to claim 15, wherein each scheduler is provided with a reporting sub-task for reporting a corresponding load distribution to the load balance repository.

17. The system according to claim 15, wherein each scheduler is adapted to relinquish a portion of a time slice allotted to the corresponding process by an operating system when the load distribution in the corresponding process equals or exceeds the target load distribution.

* * * * *